Aug. 12, 1952 D. C. ROCKOLA 2,606,765

PHONOGRAPH

Filed Oct. 4, 1946 3 Sheets-Sheet 1

Inventor:
David C. Rockola
By Sheridan, Davis & Cargill
Attys

Aug. 12, 1952 D. C. ROCKOLA 2,606,765

PHONOGRAPH

Filed Oct. 4, 1946 3 Sheets-Sheet 2

Inventor.
David C. Rockola

By: Sheridan, Davis & Cargill
Attys.

Aug. 12, 1952 D. C. ROCKOLA 2,606,765

PHONOGRAPH

Filed Oct. 4, 1946 3 Sheets-Sheet 3

Inventor:
David C. Rockola
By: Sheridan, Davis & Cargill
Attys.

Patented Aug. 12, 1952

2,606,765

UNITED STATES PATENT OFFICE 2,606,765

PHONOGRAPH

David C. Rockola, Chicago, Ill., assignor, by mesne assignments, to Rock-Ola Manufacturing Corporation, Chicago, Ill., a corporation of Delaware Application October 4, 1946, Serial No. 701,365

3 Claims. (Cl. 274—10)

This invention relates in general to automatic phonographs, and particularly to those in which the records are stored therein in stack position, or in normally superposed relationship, and are moved therefrom to and from cooperative relationship with the turntable by selective actuation of the operating mechanism.

Such a machine is illustrated in detail in U. S. Letters Patent No. 2,159,834, issued May 23, 1939, to Paul H. Smyth, Jr. Whenever it is desired to change one of the records in such a phonograph, it is necessary for the operator to selectively actuate the operating mechanism to cause the record carrier containing the record it is desired to change to be moved thereby out of its normal stack position, since it is practically impossible to remove the records from their carriers when they are disposed in their normal superposed relationship. The operator must then interrupt the cycle of operation to accomplish the desired record change, which is customarily done by breaking the electrical circuit to the machine, after which he must close the broken circuit to permit the operating mechanism to complete its normal cycle.

A principal object of the instant invention is to enable the changing of records in a phonograph in which the records normally are arranged in superposed relationship without necessitating actuation of the operating mechanism.

Another object of the invention is the provision in a multi-record phonograph having a plurality of independently swingable record carriers normally arranged in superposed relationship, a turntable spaced laterally from the superposed record carriers, and selectively controlled operating mechanism for automatically swinging the record carriers individually to and from cooperative relationship with the turntable, of novel record carrier swinging means normally disposed in cooperative relationship with the record carriers but manually movable out of such cooperative relationship to permit swinging of the record carriers out of superposed relationship to enable changing of the records carried thereby without necessitating actuation of the operating mechanism.

Numerous other objects and advantages of the invention will be apparent as it is better understood from the following description, which, when taken in connection with the accompanying drawings, discloses a preferred embodiment thereof.

Figure 1:
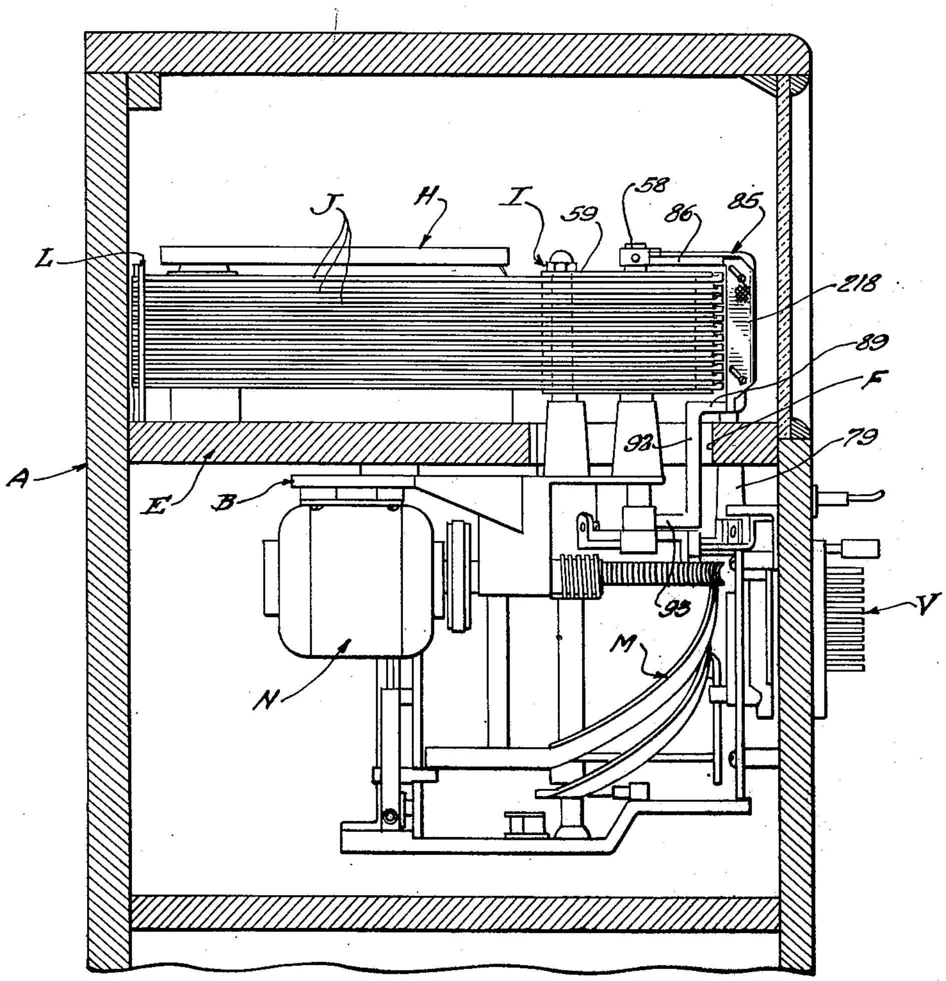
Figure 1 is a vertical sectional view of the upper portion of a phonograph embodying the features of the instant invention.

Referring more particularly to the drawings, the operating mechanism of the phonograph illustrated is generally of the type disclosed in the previously noted Smyth Patent No. 2,159,834, and the alphabetical reference characters used herein are the same as those employed in said patent and designate similar mechanism. Since this mechanism is described in detail in said patent, a brief and general explanation thereof will be sufficient herein for a complete understanding of the present invention.

Figure 2:
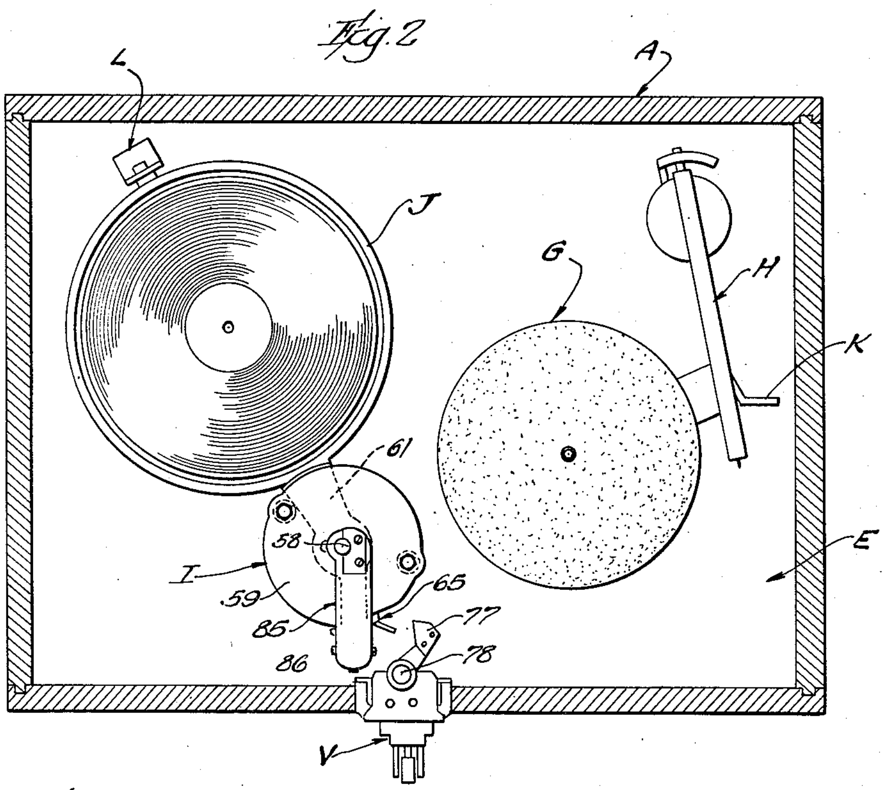
Fig. 2 is a plan view of the operating mechanism with the casing of the phonograph shown in section.

The phonograph comprises an outer casing or cabinet A for accommodating a chassis or frame B for supporting the operating mechanism, which includes record carrying and reproducing devices cooperating to translate the irregularities of a record sound track into mechanical vibrations and to convert the latter into electrical impulses which are supplied to amplifier means and a speaker (not shown herein) for converting the amplified electrical impulses into sound. As shown in Figs. 1 and 2, the chassis B includes a horizontally disposed panel E, commonly referred to as a motor board, having an aperture F therein, and carries a turntable G, record playing or reproducing means H, a record carrier supporting or mounting assembly I, and a plurality of pivoted, ring-shaped record carriers or trays J arranged one above another in column or stack relationship and swingable to and from cooperative relationship with the turntable G. Members K and L provide individual supports for each record carrier J at the end thereof opposite the mounting assembly I when the record carrier is in its position of cooperation with the turntable G and when it is in stack, respectively. Supported from and disposed below the motor board E are a master cam M, a motor N for driving the same, and a second motor for rotating the turntable G, which is not shown in the instant drawings. Operation of the phonograph is controlled by coin operated means and record selector control means V, as described in detail in said Smyth patent, through the agency of which the motor N is energized to cause rotation of the master cam M, the tray J carrying the record selected for playing is swung from its stacked position of Figs. 2 and 4 over the turntable G, and the latter is raised through the selected record carrier J to remove the selected record therefrom and to its upper-most position to present the record for engagement by the tone arm H. The second motor for rotating the turntable G has in the meantime been energized in response to actuation of the master cam M, and as the turntable reaches such upper-most playing position, the master cam driving motor N is de-energized. When the tone arm or reproducer means H reaches the end of the record groove to complete playing of the record, the motor N for driving the master cam M is again energized, and the latter causes the turntable G to be lowered through the selected carrier J and back to normal position. As the turntable is lowered from playing position, the master cam functions to return the tone arm H to normal or starting position, and after the played record is deposited on its carrier J, the master cam also functions to swing this record carrier back to its normal stacked position. The circuit including the electric motor N driving the master cam M and that including the motor operating the turntable G are then interrupted to complete the cycle of operations, unless more than one record has been selected for playing, in which case the cycle is repeated until all selected records have been played.

The record carrier supporting or mounting assembly I includes a vertical shaft or post 58 pivotally associated with all of the record carriers J and successive discs 59 interposed between each of the latter for supporting the same. Each record carrier has an arm or projection 61 extending beyond the peripheries of the discs 59 at the side of the assembly I opposite the record carriers proper. The arms 61 cooperate with releasable record carrier locking means for releasably locking each record carrier in stack position.

Such releasable record carrier locking means includes a shoulder 63 on each of the arms 61 and a shoulder 64 in the outer peripheral portion of each of the discs 59. A latch member indicated generally by reference numeral 65 is pivotally mounted at 66 on each of the arms 61 outwardly of the discs 59, and comprises a plate-like member formed with a finger 67 extending inwardly of the assembly I at the level of the disc 59 upwardly adjacent the arm 61 and a finger 68 extending outwardly of the assembly I at one side of the pivot 66. At the other side of the pivot 66, each latch member 65 is formed with a finger 71 adapted to extend into the space between successive discs 59. A coil spring 72 secured at one end to the arm 61 and at its other end to a depending portion 75 of the finger 67 is adapted yieldably to hold each of the latch members 65 in the normal full line position of Fig. 4, in which the finger 67 interlockingly engages the disc shoulder 64 of the next upper disc 59 for releasably locking the corresponding record carrier in stack position.

The finger 71 herein illustrated is of slightly different configuration than those shown in the Smyth patent and referred to therein by the same reference numeral, but its function is identical with the similarly designated member in the Smyth construction. Likewise, the spring 72 herein illustrated functions in the same manner as the spring 72 in the Smyth patent, although specifically differently associated with the latch member 65.

The depending portion 75 of each finger 67 extends into the space between adjacent discs 59, and at its other end is formed at an angle to provide a laterally extending finger 76. The fingers 76 of the several latch members 65 are selectively operable by a selector 77 carried at the upper end of a rockable and longitudinally reciprocable shaft 78 slidably journalled at 79 (Fig. 1) and comprising the record carrier releasing means. Under the control of the coin operated means and record selector control means V, as described in detail in the Smyth patent referred to, each cycle of operation of the machine includes vertical movement of the shaft 78 in accordance with the position in the stack of the record selected for playing to position the selector 77 horizontally opposite the latch 65 of the carrier J supporting such selected record. The master cam M then functions to rotate the shaft 78 and selector 77 in a counter-clockwise direction, as viewed from above, from its full line position to its broken line position of Fig. 4. Such movement of the selector 77 functions to release the latch 65 opposite which it has been selectively disposed and to move the same, together with arm 61 of the record carrier J upon which it is mounted, to a position in which it is operatively associated with a record carrier swinging means indicated generally by reference numeral 85.

The record carrier swinging means 85 includes an arm 86, vertically disposed channel legs 87 and 88, an off-set extension 89 of the arm 86 below the assembly I extending inwardly of the latter and parallel to and separate from the panel E (Fig. 3), and an angular connecting member having a leg 92 connected to the inner end of the off-set portion 89 and extending therefrom through the aperture F (Fig. 1) and a leg 93 extending from the leg 92 to the pivot post 58 and including a suitable bearing surrounding the lower end of the latter.

The above referred to releasing action upon a latch 65 by the selector 77 combines pivotal movement of the latch about the pivot 66 and swinging movement of its supporting arm 61 about the post 58. The initial portion of this movement comprises swinging of the latch 65 about the pivot 66 from its full line position of Fig. 4 to the broken line position indicated therein at 65*a*, which releases the finger 67 of the latch from the disc shoulder 64. Further movement of the selector 77 against the finger 76 continues such rotation of the latch 65 about its pivot 66 and swings the arm 61 on the post 58 to carry these two members to their dotted line positions designated in Fig. 4 as 65*b* and 61*a*. It will be noted from this view of the drawings, that the finger 68 of the latch 65 is thus moved from a position clear of the channel leg 87 into a position in which it is disposed between the channel legs 87 and 88, and that the finger 67 has been moved out of latching relationship with the disc shoulder 64 and into contact with the edge portion 84 of the next upwardly adjacent disc 59, whereby the corresponding record carrier J is free and may be swung about the pivot post 58 to and from its position of alignment with the turntable, except for the interference accorded the shoulder 63 by the channel leg 88. Engagement between the edge portion 84 of the disc 59 and the finger 67 holds the released latch member 65 in released position against the action of its spring 72 during the swinging of the record carrier.

Figures 4, 5:
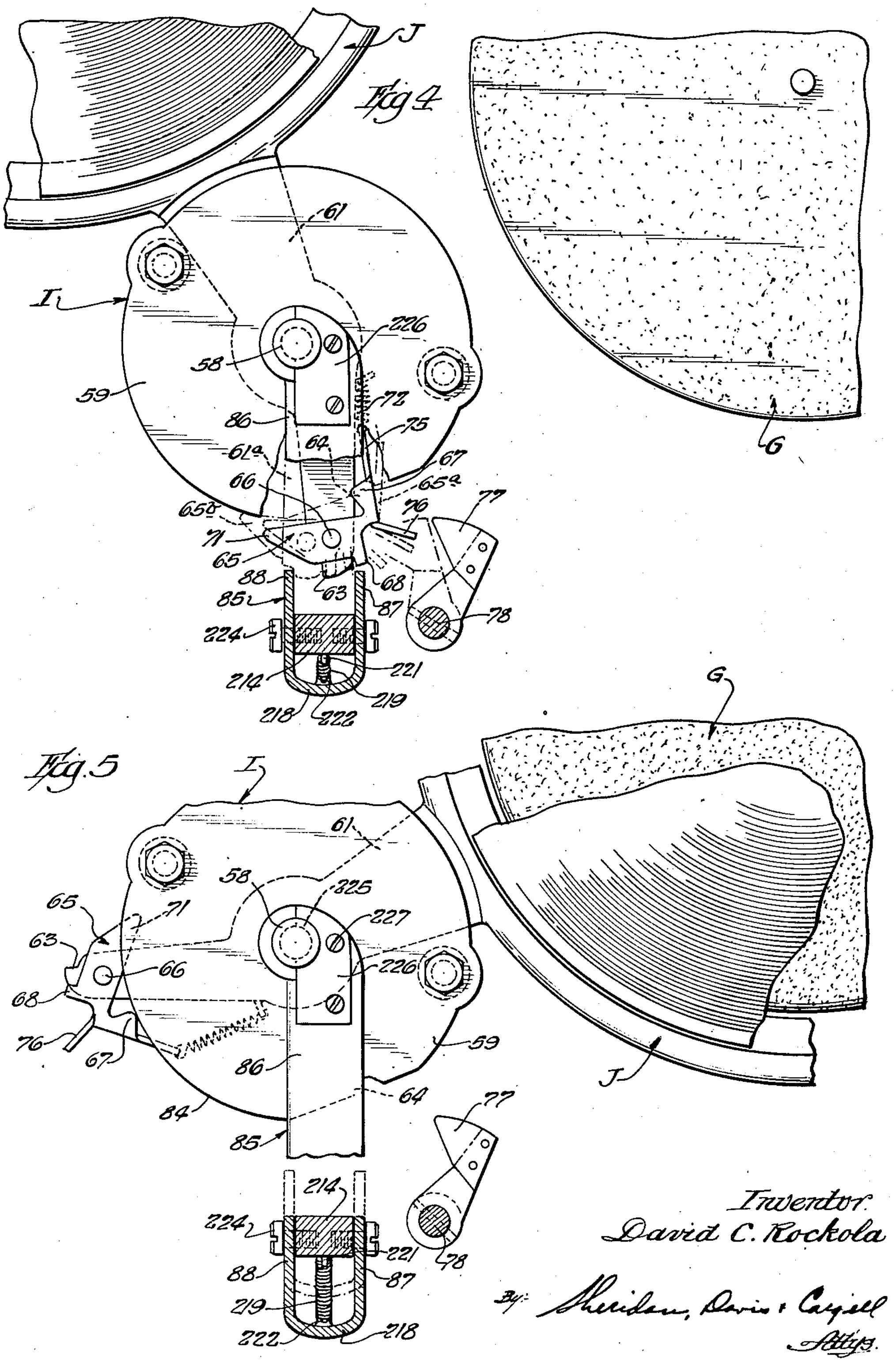
Fig. 4 is an enlarged detail plan view of part of the operating mechanism showing the releasable record carrier swinging means in horizontal section and a record carrier in stack position.
Fig. 5 is a view similar to Fig. 4 showing the record carrier in position over the turntable and the releasable carrier swinging means in retracted position.

By cooperation with the master cam M in the manner described in detail in the Smyth patent referred to, the record carrier swinging means 85 is swung about the post 58 during each cycle of operation of the machine, after the above-described releasing action of the selector 77, to carry the selected record carrier, through co-action of the finger 68 of the latch 65 mounted thereon and channel leg 87, from its position of Fig. 4 to that of Fig. 5, wherein it is disposed in vertical alignment with the turntable G. Following completion of the playing of the selected record, the same is returned to its record carrier J by lowering of the turntable G, and the master cam M functions to return the record carrier swinging means 85 to its position of Fig. 4. During such return movement of the record carrier swinging means 85, the shoulder 63 of the arm 61 of the record carrier is engaged by the channel leg 88 to swing the record carrier back to stacked position, wherein it is latched by the automatic engagement of the finger 67 of its latch 65 with the disc shoulder 64 of the associated disc 59 by its spring 72. It will be appreciated that, because of the laterally off-set arrangement of the record carrier swinging means 85 relative to its pivot 58, as seen in Fig. 4, clockwise swinging of this means 85 from its normal position of Fig. 4 will have no effect upon any of the normally latched record carriers J, since the inner edge of channel leg 87 will clear both the shoulders 63 of arms 61 of all such record carriers and the fingers 88 of their associated normally positioned latches 65. On the other hand, since the inner edge of the other channel leg 88 of this record carrier swinging means 85 is substantially closer to the center of pivot post 58, it is disposed in the path of movement of any of the shoulders 63 so as to limit initial clockwise swinging of a selected record carrier and to return the latter to stack position, after playing of the selected record, in the manner just described.

All of the above described mechanism and its operation is disclosed in detail in Smyth Patent No. 2,159,834, and the reference numerals so far referred to herein are employed to designate similar parts in said patent. With the record carrier swinging means disclosed in the Smyth patent, however, a record carrier J must be swung out of normal stack position by operation of the mechanism of the phonograph to enable changing of the record contained therein by an operator. Thus, any time it is desired to replace the records contained in the carriers J in the Smyth machine, it is necessary to actuate the control member of the selector control means V corresponding to one of the records which it is desired to change to cause the operating mechanism to swing the carrier J containing such record out of stack position and into its position of Fig. 5, at which point the selected record may be readily removed from its carrier. This necessitates the stopping of the operation of the machine during the normal record playing portion of the cycle. Such method of changing records is extremely cumbersome, and is necessitated because, although the individual latches 65 may be manually released and moved with their record carriers to the broken line positions indicated in Fig. 4 at 65*b* and 61*a*, further swinging of the record carriers from their superposed relationship is prevented by the channel leg 88 of the record carrier swinging means 85.

The instant invention comprises a novel record carrier swinging means which is manually releasable to withdraw the channel leg 88 from the path of movement of the shoulders 63 of the arms 61 and the fingers 68 of the latches 65 to enable swinging of the record carriers J to their position of Fig. 5 to permit changing of the records carried thereby without necessitating actuation of the phonograph operating mechanism.

Figure 3:
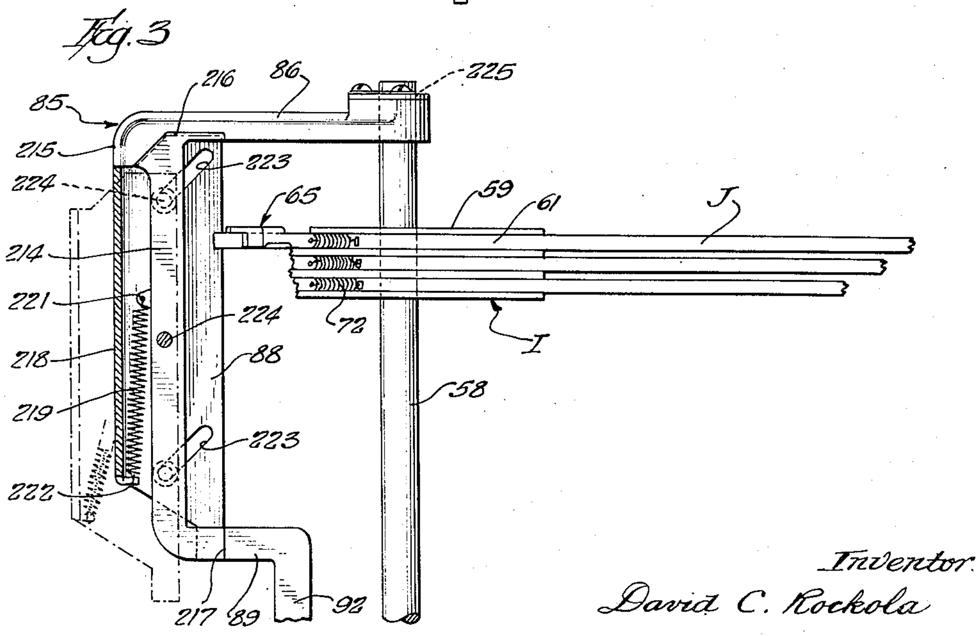
Fig. 3 is a detail elevational view of part of the record carrier mounting mechanism illustrating the novel releasable carrier swinging means.

In the present embodiment of the record carrier swinging means 85, the arm 86 is provided with a vertically disposed portion 214 (Fig. 3) parallel with the pivot post 58 and joining the off-set portion 89 at its lower end. The outer end of the arm 86 preferably is rounded and extends outwardly beyond this vertical portion 214 at 215 and is provided on each side with an angular recess 216, the lateral surfaces of which comprise extensions of the side surfaces of the vertical portion 214. The off-set portion 89 is similarly provided with recesses 217 in its side walls, the lateral surfaces of which comprise extensions of the side surfaces of the vertical portion 214. A channel member 218 slidably engages the side or lateral surfaces of the vertical portion 214, with the side walls thereof comprising the previously mentioned channel legs 87 and 88. As shown in Fig. 3, the upper and lower ends of each of these channel legs 87 and 88 are so shaped as to normally engage within the recesses 216 and 217, respectively.

Means are provided for normally retaining the channel member 218 in its full line position of Figs. 3 and 4 in cooperative relationship with the record carriers J and their latches 65, which comprises a coil spring 219 connected at its upper end at 221 to the swingable member or vertical portion 214 of the arm 86 and at its lower end at 222 to the lower end of the outer wall of the channel member 218. The spring 219 thus functions to urge the channel member 218 upwardly and inwardly relative to the vertical portion 214 of the arm 86. Means are also provided for guiding movement of the channel member 218 relative to the vertical portion 214 of the arm 86. This means comprises oblique slots 223 in the side walls or leg portions 87 and 88 of the channel member 218 slidingly engaging associated stud bolts 224 screwed into suitable tapped apertures in the vertical portion 214. In the embodiment herein illustrated, the channel leg 87 is provided with one centrally located such oblique slot 223, while the channel leg 88 is provided with two such slots located, respectively, adjacent the vertical ends thereof. The bolts 224 slidingly cooperating with the slots 223 thus guide movement of the channel member 218 relative to the vertical portion 214 of the arm 86 and limit such downward and outward movement of the member 218 to a position wherein the inner edges of the channel legs 87 and 88 are substantially flush with the inner surface of the vertical portion 214, as shown in full lines in Fig. 5. Inward and upward movement of the channel member 218 by the spring 219 is also limited by the bolts 224 and slots 223, although such movement could be limited by the engagement of the leg portions 87 and 88 with the upper surfaces of the recesses 216 and/or the inner, vertical surfaces of the recesses 217.

In the inner-most or normal position of the channel member 218, as shown in full lines in Fig. 4, release of any of the latches 65 will dispose the finger 68 thereof between the channel legs 87 and 88 to enable swinging movement of the associated record carrier J by the previously described swinging action of the member 85. Such normal position of the channel member 218, similarly to the yoke-like member 85 of the Smyth patent, also prevents free swinging movement of the released record carrier J by engagement of the shoulder 63 of its arm 61 with the channel leg 88.

However, in order to swing any of the record carriers J from their normal superposed position of Fig. 4 to the position over the turntable G illustrated in Fig. 5 for the purpose of changing the record carried thereby, it is only necessary to manually release the record carrier latch 65 and to move the channel member 218 downwardly and outwardly against the action of its spring 219 from its full line position of Figs. 3 and 4 to its broken line position of Fig. 3 and full line position of Fig. 5. The channel leg 88 is thus removed from the path of movement of the shoulder 63 of the arm 61 and the leg 68 of the latch 65 of the released record carrier J, so that the latter may be swung manually to its position of Fig. 5. All that is necessary to return the record carrier J to stack position, following the changing of the record carried thereby, is to again move the channel member 218 to its inoperative full line position of Fig. 5 and swing the record carrier J back to its normal full line position of Fig. 4. Such return movement of the record carrier J is readily accomplished, because the latch 65 and arm 61 will clear the channel member 218 when the latter is moved to its inoperative position. Manual release of the channel member 218 enables the spring 219 to slide the same upwardly and inwardly on the bolts 224 back to its normal operative position.

As previously explained, the inner end of the leg 93 (Fig. 1) carries a suitable bearing engaging the lower end of the pivot post or shaft 58. In the present embodiment of the releasable record carrier swinging means, the inner end of the upper arm 86 is similarly provided with a suitable bearing for engaging the shaft 58. In order to facilitate assembly of these parts, the shaft 58 is provided adjacent its upper end with a channel 225 (Fig. 3) engageable by a recessed portion of a plate 226 mounted upon the upper surface of the arm 86 and secured thereto by suitable screws 227. With this arrangement, the shaft 58 is readily insertable into or removable from the record carrier mounting assembly I from the upper end, the plate 226 cooperating with the channel 225 to retain the post 58 in assembled position.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a multi-record phonograph having a plurality of record carriers arranged in superposed relationship in stack position, a turntable spaced laterally from said superposed record carriers, and selectively controlled operating mechanism for automatically moving said record carriers individually from such stack position to and from playing position in cooperative relationship with said turntable; record carrier moving means forming a part of said operating mechanism and including automatically selectively releasable means normally latching said record carriers in superposed relationship, and a record carrier moving member normally cooperatively engageable with said latching means upon selective release of the latter to move the associated said record carriers between stack and playing positions, said member being manually movable out of such cooperative relationship with said latching means to enable manual release of the latter and manual movement of said record carriers out of superposed relationship for the purpose of changing the records carried thereby without necessitating automatic actuation of said operating mechanism; and means connected to said member for resiliently maintaining the same in normal cooperative relationship with said latching means.

2. In a multi-record phonograph, having operating mechanism comprising a plurality of independently swingable record carriers normally arranged in superposed relationship, record reproducer means, a turntable cooperable with said record carriers for moving records to and from playing relation with said reproducer means, means releasably latching said record carriers in superposed relationship, and selector means for operating said latching means to release any said record carrier; manually releasable record carrier swinging means normally positioned for receiving any said latching means released and moved into engageable position therewith by said selector means, and operable to swing the record carrier associated with said released latching means to and from cooperative relationship with said turntable, said latching means being manually releasable and said record carrier swinging means being manually movable out of normal latching means receiving position to enable manual swinging of said record carriers out of superposed relationship to permit changing of the records carried thereby without necessitating actuation of said operating mechanism, and means for automatically returning said record carrier swinging means to normal latching means receiving position after being manually moved therefrom.

3. In a multi-record phonograph having a plurality of independently swingable record carriers normally arranged in superposed relationship, a turntable spaced laterally from said superposed record carriers, and selectively controlled operating mechanism for automatically swinging said record carriers individually from such superposed relationship to and from cooperative relationship with said turntable; record carrier swinging means forming a part of said operating mechanism and including releasable means normally latching said record carriers in superposed relationship, a record carrier swinging member, a channel member for selectively engaging any of said released latching means and movable with said swinging member to impart the desired movement to the record carrier associated with said released latching means during automatic actuation of said operating mechanism, means inter-connecting said channel member and said swinging member to enable limited manual movement of the former relative to the latter out of cooperative relationship with said latching means, whereby said latching means may be manually released and said record carriers moved out of superposed relationship to facilitate changing of the records carried thereby without necessitating automatic actuation of said operating mechanism, and spring means inter-connecting said channel member and said swinging member for normally retaining said channel member in cooperative relationship with said latching means.

DAVID C. ROCKOLA.

REFERENCES CITED

The following references are of record in the file of this patent:

UNITED STATES PATENTS

| Number | Name | Date |
|---|---|---|
| 2,159,833 | Smyth | May 23, 1939 |
| 2,215,141 | Wilcox | Sept. 17, 1940 |